United States Patent
Chambers et al.

(12) 
(10) Patent No.: US 6,605,013 B2
(45) Date of Patent: Aug. 12, 2003

(54) BELT TENSIONER COMBINATION AND A METHOD OF INSTALLING A TENSIONER ON A BELT

(75) Inventors: Donovan R. Chambers, Toronto (CA); Joseph Atikian, Toronto (CA)

(73) Assignee: Litens Automotive Partnership, Woodbridge (CA)

(*) Notice: Subject to any disclaimer, the term of this patent is extended or adjusted under 35 U.S.C. 154(b) by 0 days.

(21) Appl. No.: 09/951,776

(22) Filed: Sep. 14, 2001

(65) Prior Publication Data

US 2002/0037783 A1 Mar. 28, 2002

Related U.S. Application Data

(60) Provisional application No. 60/232,837, filed on Sep. 15, 2001.

(51) Int. Cl.$^7$ ................................................. F16H 7/12
(52) U.S. Cl. ........................................ 474/135; 474/133
(58) Field of Search ............................. 474/135, 133, 474/113–117, 112, 101, 109, 119

(56) References Cited

U.S. PATENT DOCUMENTS

| | | |
|---|---|---|
| 429,877 A | 6/1890 | Anderson |
| 3,374,686 A | 3/1968 | Brewer |
| 3,391,807 A | 7/1968 | Buschbom |
| 3,623,378 A | 11/1971 | Stanford |
| 3,839,920 A | 10/1974 | Mulvany et al. |
| 4,351,636 A | 9/1982 | Hager |
| 4,472,162 A | 9/1984 | Hitchcock |
| 4,583,962 A * | 4/1986 | Bytzek et al. .............. 474/135 |
| 4,696,663 A * | 9/1987 | Thomey et al. ............ 474/133 |
| 4,743,225 A | 5/1988 | Okabe |
| 4,758,208 A | 7/1988 | Bartos et al. |
| 4,767,383 A | 8/1988 | St. John |
| 5,083,984 A | 1/1992 | Quintus et al. |
| 5,129,864 A | 7/1992 | Quintus et al. |
| 5,169,368 A | 12/1992 | Quintus et al. |
| 5,205,792 A | 4/1993 | Quintus et al. |
| 5,234,385 A * | 8/1993 | Kawashima et al. ....... 474/135 |
| 5,354,242 A | 10/1994 | St. John |
| 5,358,452 A | 10/1994 | Zhao |
| 5,591,094 A | 1/1997 | Farmer et al. |
| 5,647,813 A * | 7/1997 | Serkh .......................... 474/135 |
| 5,820,503 A * | 10/1998 | Bruchner et al. ........... 474/133 |
| 5,935,032 A | 8/1999 | Bral |
| 5,938,552 A | 8/1999 | Serkh |
| 5,967,919 A * | 10/1999 | Bakker ....................... 474/135 |

FOREIGN PATENT DOCUMENTS

| | | |
|---|---|---|
| DE | 41 18 901 A | 12/1992 |
| JP | 09-300981 A * | 11/1997 |
| JP | 11257444 | 9/1999 |
| WO | WO 00/34684 | 6/2000 |

* cited by examiner

*Primary Examiner*—Marcus Charles
(74) *Attorney, Agent, or Firm*—Pillsbury Winthrop LLP

(57) ABSTRACT

A combination comprises a belt trained about a plurality of pulleys and a tensioner assembly including a rotary member rotatively engaged by one side of the belt at an operative position. The rotary member is rotatably mounted on an arm pivoted about a fixed pivotal axis and has a rotational axis parallel with the fixed pivotal axis. The vector force applied by the belt to the periphery of the rotary member at the bisector of the belt wrap angle extends through the rotational axis and is related by at least a small angle to a line passing through the rotational and pivotal axis. The vector force acts in a direction to bias the arm to pivot about the pivotal axis in a direction to move the rotary member into the operative position. The rotary member is initially installed into the operative position by moving the arm in the direction from an installation position.

13 Claims, 6 Drawing Sheets

BELT TENSIONER COMBINATION AND A METHOD OF INSTALLING A TENSIONER ON A BELT

CROSS-REFERENCE TO RELATED APPLICATIONS

This Application claims priority benefit of provisional Application Ser. No. 60/232,837, filed on Sep. 15, 2001, the entirety of which is hereby incorporated into the present application by reference.

FIELD OF THE INVENTION

The present invention relates to the installation of belt tensioners with belts. More specifically, the present invention relates to belt tensioners which can be easily and economically installed in operative relation with a drive belt.

BACKGROUND OF THE INVENTION

Belt drives require a means or a device within the system to tension the belt. This may be accomplished by using a manual adjust lock center pulley, an automatic tensioner, or a low modulus belt. These means or devices must also accommodate belt installation and removal over pulley flanges.

Manual adjust lock center pulleys (fixed tensioner) typically use a jack-screw method to move the pulley for tension setting, which is generally tedious and long. The pulley is then required to be locked in position, but this operation can often be missed and sometimes result in NVH or fatigue field failure of the belt. Additional tools such as a lift spanner and Clavis/frequency meter are required.

Automatic tensioners can be difficult to package for size and function, as they are relatively complex devices with many components. Further, they are costly to manufacture. An additional tool such as a lift spanner would be required.

Low modulus belts require an installation tool to stretch them sufficiently to roll over the pulley flange and also have inherent elasticity to provide system tension. Low modulus belts can be overstressed or prematurely damaged, and other pulleys may be damaged with the additional installation tool.

From the above, it can be seen that a fixed tensioner-belt combination is simpler in construction and economical to manufacture but presents difficulties in installation, servicing, and reinstallation. On the other hand, an automatic tensioner-belt combination is more complex in construction and less economical to manufacture but easy to install. What is needed is a tensioner-belt combination which functions as a fixed tensioner-belt combination with the attendant simplicity of construction and economy in manufacture while achieving the same ease of installation as an automatic tensioner-belt combination.

SUMMARY OF THE INVENTION

It is an object of the present invention to meet the above-described needs. In accordance with the principles of the present invention, this objective is achieved by providing a combination comprising a belt trained about a plurality of pulleys and a tensioner assembly including a rotary member rotatively engaged by one side of the belt at an operative position. The rotary member is rotatably mounted on an arm pivoted about a fixed pivotal axis and has a rotational axis parallel with the fixed pivotal axis. The vector force applied by the belt to the periphery of the rotary member at the bisector of the belt wrap angle extends through the rotational axis and is related by at least a small angle to a line passing through the rotational and pivotal axis. The vector force acts in a direction to bias the arm to pivot about the pivotal axis in a direction to move the rotary member into the operative position. The rotary member is initially installed into the operative position by moving the arm in the direction from an installation position.

In accordance with another aspect of the invention, there is provided a method of installing a belt tensioner on a belt trained about a plurality of pulleys, the belt tensioner comprising an arm having a rotary member rotatably mounted thereon for rotation about a rotational axis. The method comprises pivotally mounting the arm at a predetermined fixed position so as to pivot about a fixed pivotal axis parallel with the rotational axis. The method further comprises moving the arm and the rotary member mounted thereon about the pivotal axis of the arm in one direction from an installation position wherein the periphery of the rotary member is engaged with a surface of the belt into an operative position. The vector force applied by the belt to the periphery of the rotary member at the bisector of the belt wrap angle extends through the rotational axis and is related by at least a small angle to a line passing through the rotational and pivotal axis. The vector force acts in a direction to bias the arm to pivot about the pivotal axis in a direction to move the rotary member into the operative position.

These and other objects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF THE INVENTION

Figure 7:
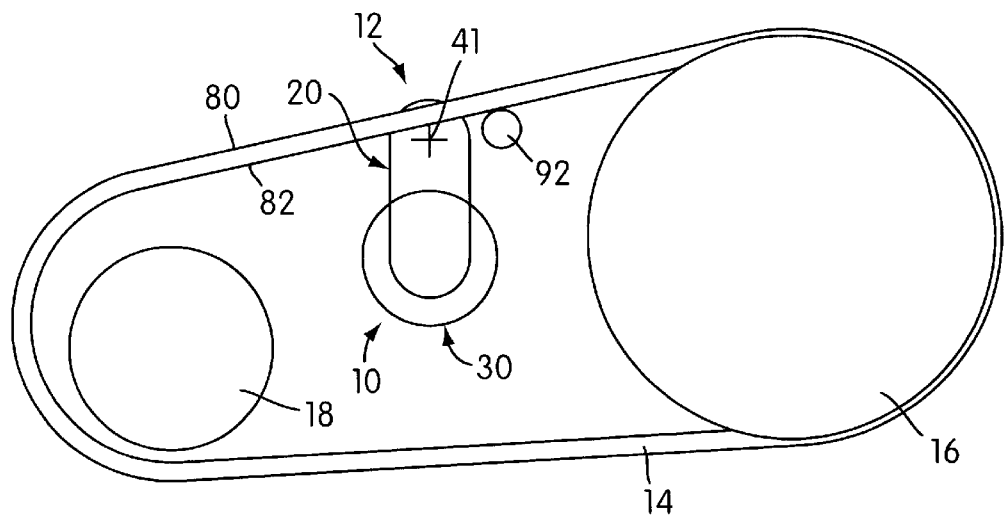
FIG. 7 is a schematic view of the combination of the present invention including a slack belt installed over pulleys with a tensioner assembly in an installation position.
Figure 8:
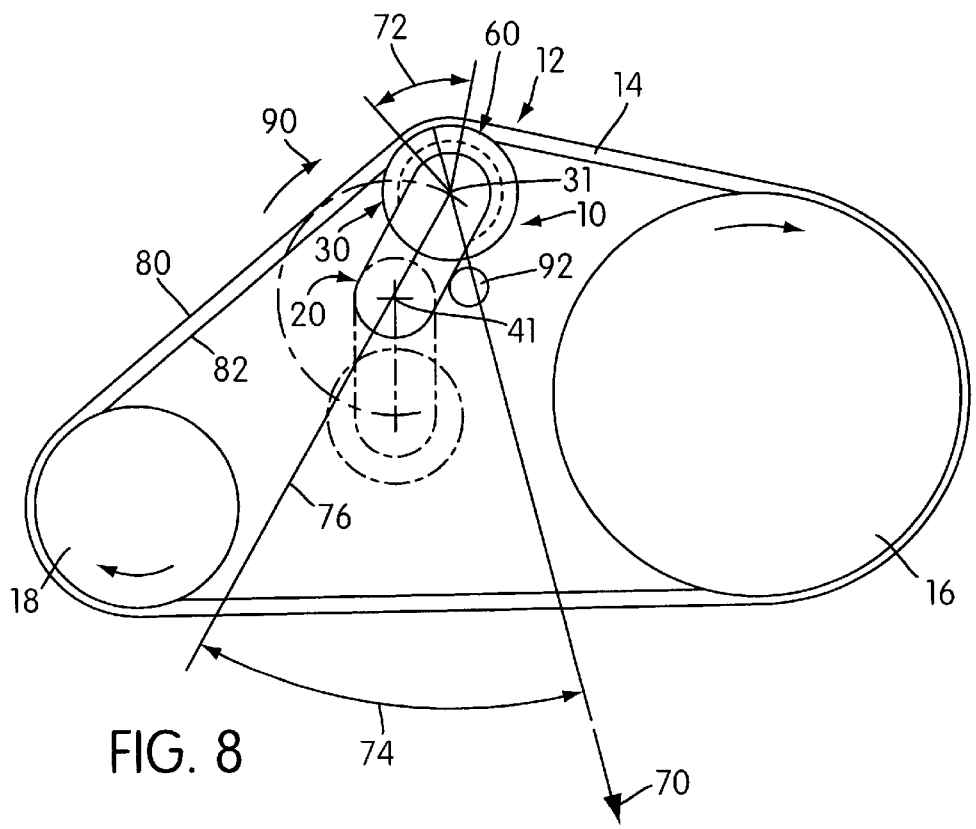
FIG. 8 is a schematic view showing the combination of FIG. 7 wherein the tensioner assembly is moved from the installation position to an operative position such that the rotary member is rotatively engaged by an inner side of the belt.
Figure 9:
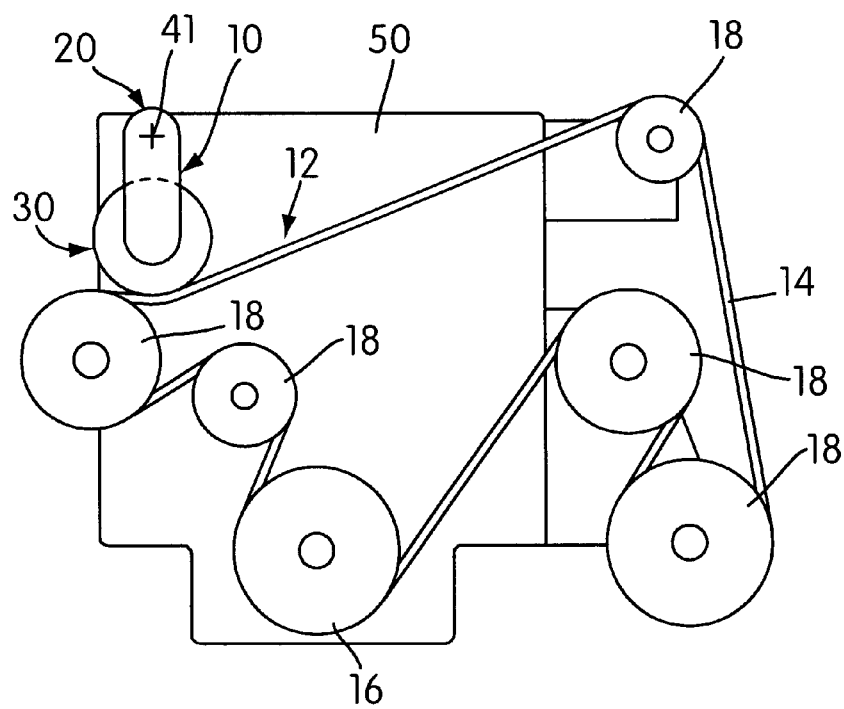
FIG. 9 is a schematic view showing the combination of the present invention wherein the tensioner assembly forms a part of a serpentine drive system.

FIGS. 1–4 show a tensioner assembly 10, which tensioner assembly 10 forms a part of a combination 12 of the present invention. The combination 12, as shown in FIGS. 5–9, includes the tensioner assembly 10 and a belt 14 trained about a plurality of pulleys. The combination may form parts of a belt drive system including a drive pulley 16 and at least one driven or idler pulley 18, as indicated in FIGS. 5–8. As shown in FIG. 9, a preferred embodiment of the combination is a tensioner assembly 10 with a serpentine belt 14 forming parts of a drive system for a motor vehicle. The combination has particular applicability to shorter serpentine belt systems.

The belt 14 is of the thin flexible type, as for example, a poly-V belt. The belt 14 is trained about the drive pulley 16 and sequence of driven or idler pulleys 18, which pulleys 16, 18 are mounted to a fixed component 50, such as an engine block if the tensioner assembly 10 forms a part of a serpentine drive system of a motor vehicle. However, the fixed component 50 may be a fixed bracket which forms a part of the belt drive system. The belt 14 is tensioned by the tensioner assembly 10, as will be further detailed below.

Figure 5:
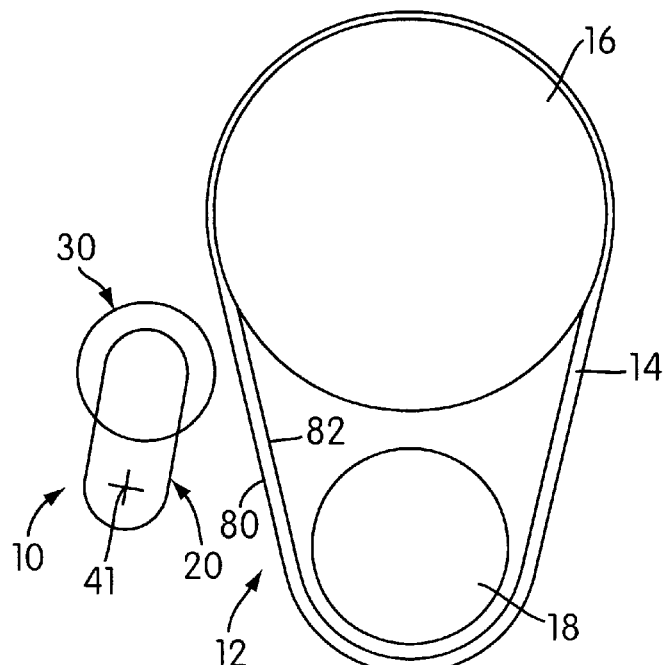
FIG. 5 is a schematic view of the combination of the present invention including a slack belt installed over pulleys with a tensioner assembly in an installation position.
Figure 6:
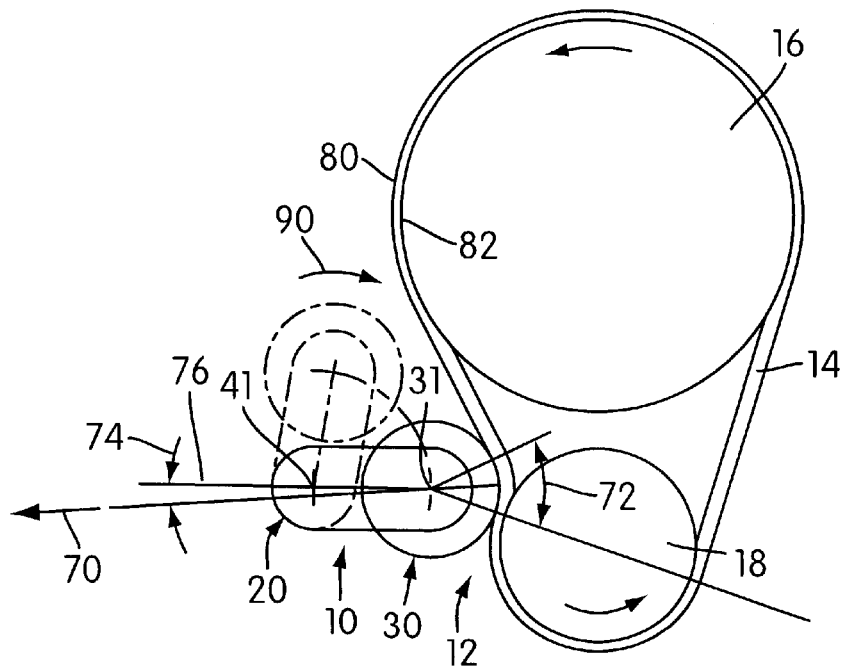
FIG. 6 is a schematic view showing the combination of FIG. 5 wherein the tensioner assembly is moved from the installation position to an operative position such that the rotary member is rotatively engaged by an outer side of the belt.

The main components of the tensioner assembly 10 are an arm 20, a rotary member 30, and a fixed structure 40. The arm 20 is pivotally mounted on the fixed structure 40 such that the arm 20 pivots relative to the fixed structure 40 about a fixed pivotal axis 41 between an installation position, as shown in FIGS. 5 and 7, and an operative position, as shown in FIGS. 6, 8, and 9. One end of the arm 20 has a pivot opening 22. The opposite end of the arm 20 has a post member 24 integrally or otherwise formed therewith.

Figure 1:
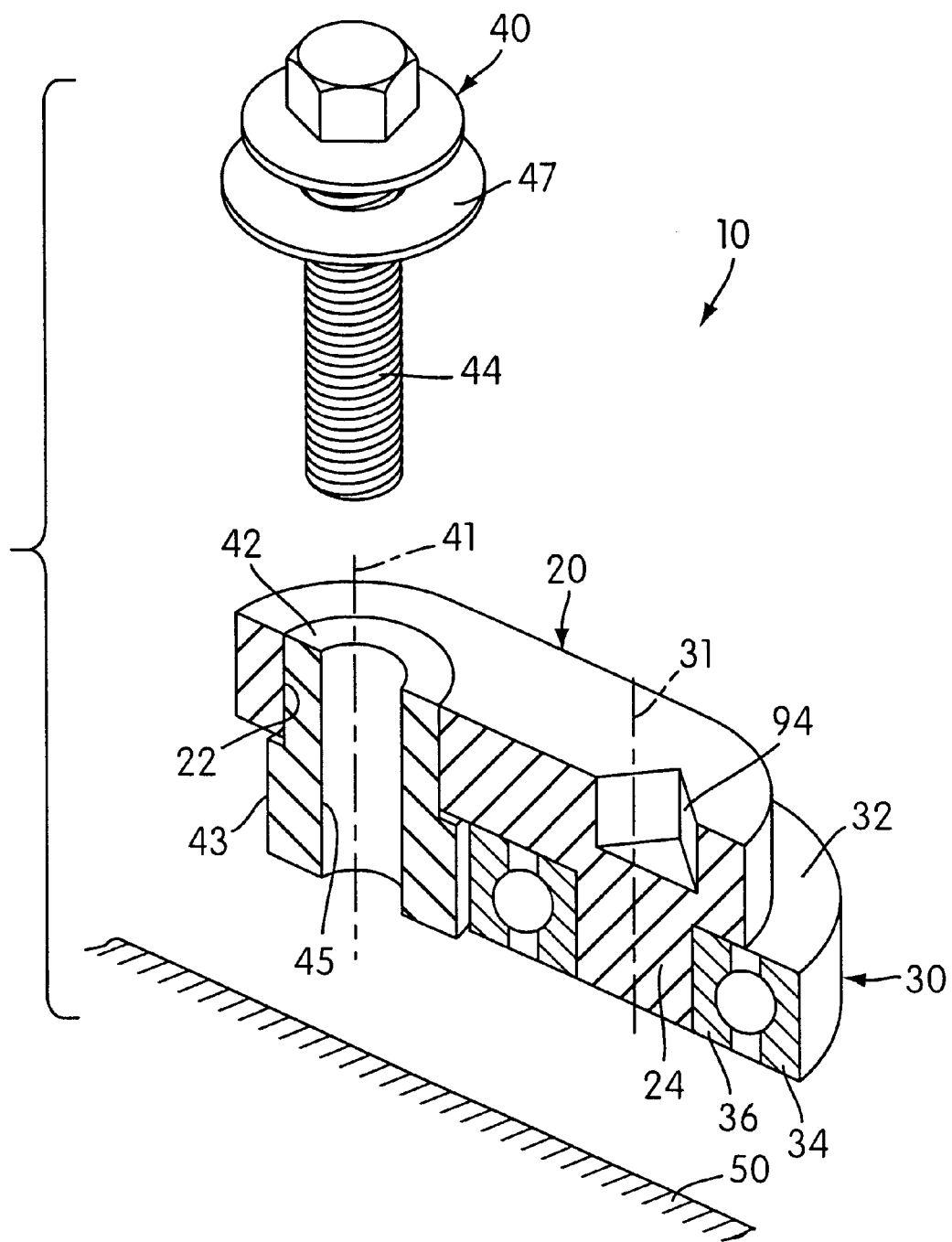
FIG. 1 is a perspective view of a tensioner assembly of the tensioner-belt combination of the present invention prior to installation.
Figure 2:
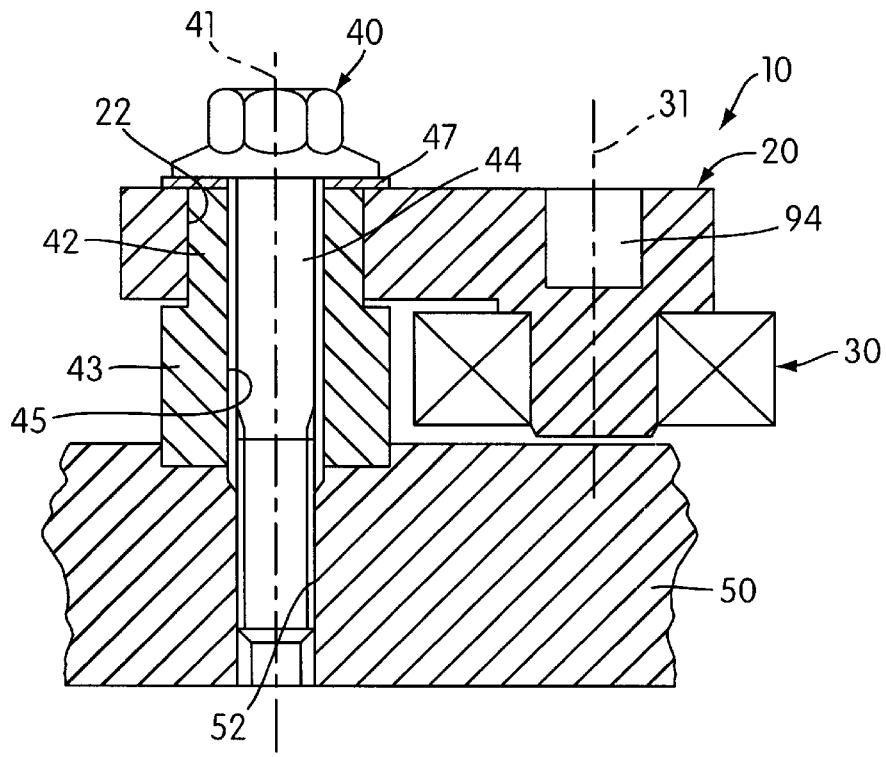
FIG. 2 is a cross-sectional view of the tensioner assembly of FIG. 1 wherein the tensioner assembly is mounted by bolting the arm to a bracket.

The fixed structure 40, as shown in the embodiment in FIGS. 1–2, is in the form of a support member 42 and a fastener 44, such as a bolt. The support member 42 is generally cylindrical with a flanged portion 43 and a generally cylindrical opening 45. The pivot opening 22 of the arm 20 is aligned with the outer peripheral surface of the support member 42 and is moved thereon such that the arm 20 rests on the flanged portion 43 and is pivotally movable with respect to the support member 42. The fastener 44 is inserted through the opening 45 in the support member 42 and is fixedly mounted within a threaded hole 52 of the fixed component 50, such as an engine block if the tensioner assembly 10 forms a part serpentine drive system of a motor vehicle. However, the fixed component 50 may be a fixed bracket which forms a part of the belt drive system. The fastener 44 secures the support member 42 to the fixed component 50 such that pivotal movement of the fixed structure 40 with respect to the fixed component 50 is prevented. A washer 47 may be inserted between the fastener 44 and the support member 42. As a result, the arm 20 pivots with respect to the fixed structure 40 about the support member 42, which defines the fixed pivotal axis 41.

Figure 3:
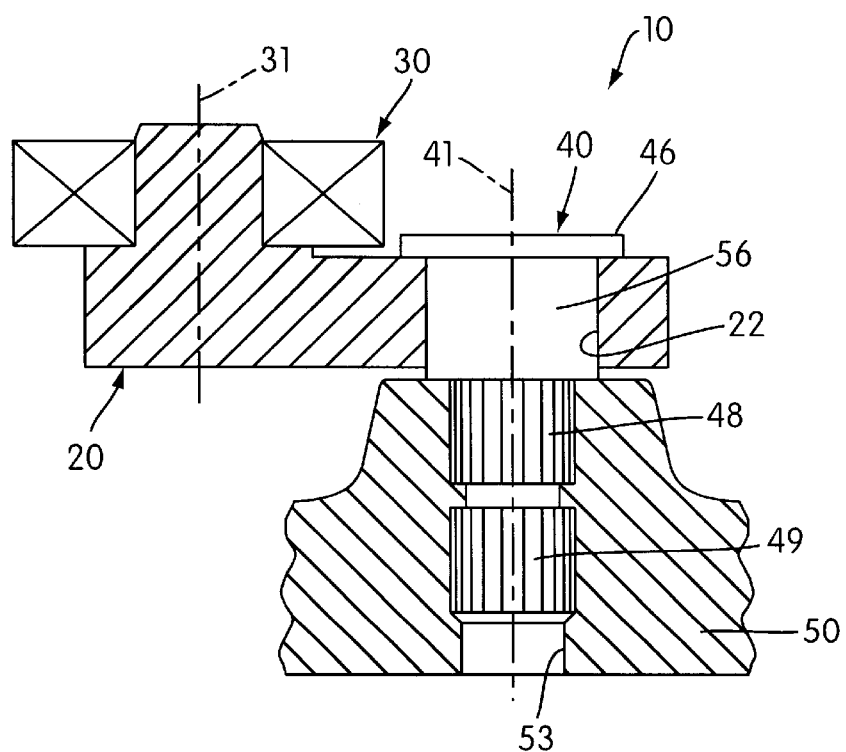
FIG. 3 is a cross-sectional view of a further embodiment of the tensioner assembly of FIG. 1 wherein the tensioner assembly is mounted by press-fitting the arm to a bracket.

Referring to FIG. 3, it is contemplated that the fixed structure 40 is in the form of a pivot shaft 46. Lower portions 48, 49 of the pivot shaft 46 may be splined or knurled such that when the splined or knurled pivot shaft 46 is press-fitted within a hole 53 of the fixed component 50, the pivot shaft 46 is prevented from pivotal movement with respect to the fixed component 50. A bushing 56 may be inserted in the pivot opening 22 about the pivot shaft 46. Thus, the arm 20 pivots about the pivotal shaft 46, which defines the fixed pivotal axis 41.

The rotary member 30, in the form of an outer race 34 of a ball bearing 32, is rotatably mounted on the post member 24 of the arm 20 and has a rotational axis 31 parallel with the fixed pivotal axis 41. The ball bearing 32 may be mounted onto the post member 24 by bolt, press-fit or other means. In the embodiment shown, an inner race 36 of the ball bearing 32 is press fitted onto the outer peripheral surface of the post member 24.

Figure 4:
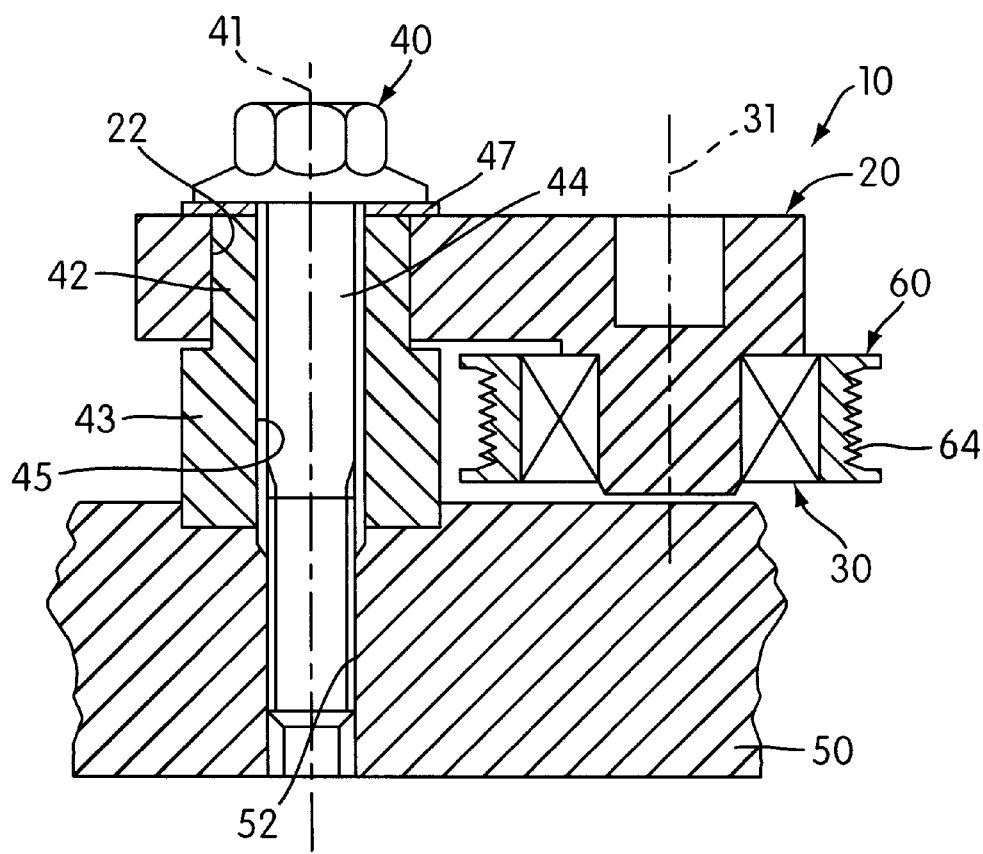
FIG. 4 is a cross-sectional view of still a further embodiment of the tensioner assembly of FIG. 1 wherein the tensioner assembly includes a poly-V pulley mounted over the ball bearing.

As shown in FIG. 4, the rotary member may be a tensioner pulley 60 which is mounted on the ball bearing 32 particularly when it is to engage the inner side of a belt which is not smooth like its outer side, as, for example a poly-V belt construction. In the embodiment shown, the outer race 34 of the ball bearing 32 is molded or press-fitted to an interior annular surface of the pulley 60, although other means of retention such as snap rings and retainers can be utilized to hold the pulley 60 thereon. The pulley 60 has an exterior poly-V surface 64 for rollingly engaging the operative poly-V side of the belt 14.

Referring now more particularly to FIGS. 5–6, FIG. 5 shows a slack belt 14 installed over a pair of pulleys, the driver pulley indicated at 16 and the driven or idler pulley indicated at 18. The arm 20, and hence the rotary member 30, is pivotally moved, in a clockwise direction in the figure, about the fixed pivotal axis 41 from the installation position shown in FIG. 5 (and FIG. 6 in phantom lines) to the operative position shown in FIG. 6.

Specifically, the arm 20 is manually rotated such that the rotary member 30 moves into the belt span of the belt 14 and the outer race 34 of the rotary member 30 rotatively engages an outer side 80 of the belt 14 as the rotary member 30 is moved to the operative position. The outer side 80 of the belt 14 represents the flat back surface of the poly-V belt 14, so it is preferred to not include the pulley 60 having the exterior poly-V surface 64 over the ball bearing 32. It is contemplated that a pulley may be installed over the ball bearing 32 which has a smooth exterior surface such that it may be engaged with the flat back surface of the poly-V belt.

Through continued rotation of the arm 20, the belt 14 is stretched/preloaded, with the belt 14 resisting rotation of the arm 20, and a vector force 70 (the vector sum of the force applied radially by the belt over the arc of contact with the periphery of the rotary member 30), also referred to as a bearing hubload vector (HLV), is applied by the belt 14 to the periphery of the rotary member 30. The HLV extends along the bisector of the belt wrap angle 72, which is subtended by the arc of contact between the rotary member 30 and the belt 14. An angle 74, referred to as a hubload angle (HLA), can then be defined between the vector force 70 and a line 76 passing through the rotational axis 31 and the pivotal axis 41.

After the arm 20 passes through a central or neutral position where the angle 74 is zero (i.e., where the vector force 70 extends directly along the line 76 passing through the rotational axis 31 and the pivot axis 41), the vector force 70 will act in a direction sufficient to assist in the continued rotation of the arm 20. Thereafter, the vector force 70 extends through the rotational axis 31 and is related by at least a small angle 74, as for example 4 to 5 degrees, to the line 76 passing through the rotational axis 31 and the pivotal axis 41. The vector force 70 acts in direction to bias the arm 20 to pivot about the pivotal axis 41 in a direction 90 to move the rotary member 30 into the operative position.

The rotary member 30 is positively prevented from moving in the direction 90 beyond the operative position, and the vector force 70 acts to hold the arm 20 and rotary member 30 in the operative position. Specifically, the rotary member 30 is positively prevented from moving in the direction 90 by abutting engagement with the belt 14 between the rotary member 30 and the driven pulley 18 engaging an inner side 82 of the belt 14. Thus, the configuration of the combination essentially permits self-locking of the tensioner assembly in the operative position. However, it is contemplated that the tensioner assembly 10 can include arm travel stops to prevent movement in the direction 90. The stops would permit a predetermined amount of rotational movement of the arm 20 relative to the fixed structure 40.

The vector force and driven pulley or travel stops provide restraints for the rotary member for self-locking at a predetermined position for desired belt tension. In one possible configuration, the vector force creates increased traction through the belt thickness at the adjacent driven pulley (resting against adjacent driven pulley).

The rotary member 30 is movable out of the operative position to facilitate belt loosening or removal and reinstallation. Specifically, the arm 20 may be pivotally moved in a counter-clockwise direction, opposite the direction 90, about the pivotal axis 41 to release the rotary member 30 from engagement with the belt 14.

Referring now more particularly to FIGS. 7–8, FIG. 7 shows a slack belt 14 installed over a pair of pulleys, the driver pulley indicated at 16 and the driven or idler pulley indicated at 18. The arm 20, and hence the rotary member 30, is pivotally moved, in a clockwise direction in the figure, about the fixed pivotal axis 41 from the installation position shown in FIG. 7 (and FIG. 8 in phantom lines) to the operative position shown in FIG. 8.

Specifically, the arm 20 is manually rotated such that the rotary member 30 moves into the belt span of the belt 14, such that the rotary member 30 rotatively engages the inner side 82 of the belt 14 as the rotary member 30 is moved to the operative position, with the belt initially resisting rotation of the arm. The inner side 82 of the belt 14 represents the poly-V side of the belt 14. In this embodiment, it is preferred that the tensioner assembly embodiment including the tensioner pulley 60 mounted on the ball bearing 32 (as shown in FIG. 4) be utilized because it has the poly-V surface 64 for rollingly engaging the poly-V side of the belt 14.

As in the configuration described above, once the arm 30 passes through a central or neutral position where the vector force 70 extends directly along the line 76 passing through the rotational axis 31 and the pivot axis 41, the vector force 70 applied by the belt 14 to the periphery of the rotary member 30 along the bisector of the belt wrap angle 72 will extend through the rotational axis 31 and be related by at least a small angle 74 to the line 76 passing through the rotational axis 31 and the pivotal axis 41. At that point, the vector force 70 acts in a direction to bias the arm 20 to pivot about the pivotal axis 41 in the direction 90 to move the rotary member 30 into the operative position.

The rotary member 30 is positively prevented from moving in the direction 90 beyond the operative position. Specifically, the rotary member 30 is positively prevented from moving in the direction 90 by the arm 20 abutting a stop 92, with the vector force 70 holding the arm 20 and rotary member 30 in the operative position.

The arm 20 may have an opening 94 (shown in FIG. 1) configured and positioned to receive a tool. The tool, such as a breaker bar, open-ended wrench, or other torque-enhancing tool, may be positioned in the opening 94 and forced in the direction 90 to facilitate manual movement of the tensioner assembly 10 from the installation position into the operative position. The tool may also be positioned in the opening 94 and forced opposite the direction 90 to facilitate pivoting of the tensioner assembly 10 out of the operative position into the installation position.

It is preferred that the angle 74 at the operative position is 4 or 5 degrees minimum. A span length between the ball bearing and the driven pulley should be approximately zero.

In its broadest aspects, the present invention includes a method of installing a belt tensioner on a belt trained about a plurality of pulleys, the belt tensioner comprising an arm having a rotary member rotatably mounted thereon for rotation about a rotational axis. The method comprises pivotally mounting the arm at a predetermined fixed position so as to pivot about a fixed pivotal axis parallel with the rotational axis. The method further comprises moving the arm and the rotary member mounted thereon about the pivotal axis of the arm in one direction from an installation position wherein the periphery of the rotary member is engaged with a surface of the belt into an operative position. The vector force applied by the belt to the periphery of the rotary member at the bisector of the belt wrap angle extends through the rotational axis and is related by at least a small angle to a line passing through the rotational and pivotal axis. The vector force acts in a direction to bias the arm to pivot about the pivotal axis in a direction to move the rotary member into the operative position.

The specification and figures have indicated that a poly-V belt is utilized which includes a smooth side and a poly-V grooved side. However, the belt may be grooved or smooth on both sides. The alternate embodiments of the tensioner assembly of the present invention (ball bearing with or without a pulley having a poly-V or smooth exterior surface) enables any type of belt to be utilized.

The tensioner assembly embodiments shown are preferred and it is preferably manually moved into the operative position with the belt as part of the method of the present invention. It is also preferred that the tensioner assembly is not locked in its operative position. But in the broadest aspects of the present invention, the tensioner assembly could be locked and it could be upgraded to move into the operative position by a spring action.

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

What is claimed is:

1. A combination comprising:
   a belt trained about a plurality of pulleys in a belt drive system; and
   a tensioner assembly including a rotary member that is rotationally engaged by one side of said belt when said tensioner assembly is positioned in an operative position, said rotary member being rotationally mounted on an arm that pivots about a fixed pivot axis and said rotary member having a rotational axis that is parallel with said fixed pivot axis;
   wherein the geometric configuration of the combination permits over-center positioning and self-locking of the tensioner assembly in the operative position such that when the tensioner assembly is positioned in the operative position, the vector sum of force applied by the belt to the periphery of said rotary member extends at at least a small angle relative to a line passing through said rotational and pivot axes, with the vector sum of force applied by the belt to the periphery of said rotary member acting in a direction to bias said arm toward and hold said arm in said operative position; and wherein the geometric configuration of the combination is such that as said rotary member is being moved into said operative position by pivoting said arm about said fixed pivot axis from an initial, belt installation position toward said operative position, the vector sum of force applied by the belt to the periphery of said rotary member initially acts in a direction to oppose pivoting movement of said arm toward said operative position but changes direction relative to said line passing through said rotational and pivot axes as said arm passes through a central or neutral position so as to bias said tensioner assembly toward and ultimately hold said tensioner assembly in said operative position, said central or neutral position being a pivotal position at which the vector sum of force applied by the belt to the periphery of said rotary member extends directly along the line passing through said rotational and pivot axes.

2. The combination according to claim 1, wherein said one side of said belt is an outer side of said belt.

3. The combination according to claim 2, wherein said tensioner assembly is self-locked in said operative position by abutting engagement with said belt between said rotary member and a pulley engaging an inner side of said belt or by a travel stop.

4. The combination according to claim 1, wherein said one side of said belt is an inner side of said belt.

5. The combination according to claim 4, wherein said tensioner assembly is self-locked in said operative position by virtue of abutting a stop.

6. The combination according to claim 1, wherein said arm has an opening configured and positioned to receive a tool that can be utilized to facilitate manual movement of said tensioner assembly into and out of said operative position.

7. The combination according to claim 1, wherein said rotary member is an outer race of a ball bearing.

8. The combination according to claim 1, wherein said rotary member is a tensioner pulley which is mounted on a ball bearing.

9. The combination according to claim 8, wherein said tensioner pulley is a poly-V pulley.

10. The combination according to claim 8, wherein said tensioner pulley is a smooth pulley.

11. A method of installing a belt tensioner in a belt drive system including a belt trained about a plurality of pulleys, said belt tensioner including an arm having a rotary member rotationally mounted thereon for rotation about a rotational axis, said method comprising:

mounting said tensioner at a predetermined position relative to said belt drive system in a manner so as to pivot about a fixed pivot axis that is parallel with said rotational axis; and pivoting said arm and the rotary member mounted thereon about the pivot axis of said arm from an initial, belt installation position of said tensioner toward and into a self-locking, over-center operative position thereof;

wherein as said arm is pivoted from said initial installation position toward and into said operative position, the vector sum of force applied by the belt to the periphery of said rotary member initially acts in a direction to oppose pivoting movement of said arm toward said operative position but changes direction relative to a line passing through said rotational and pivot axes as said arm passes through a central or neutral position and acts in a direction so as to bias said tensioner assembly toward and ultimately hold said tensioner assembly in said operative position, said central or neutral position being a pivotal position at which the vector sum of force applied by the belt to the periphery of said rotary member extends directly along the line passing through said rotational and pivot axes.

12. The method according to claim 11, wherein said arm is pivoted manually.

13. The method according to claim 12, wherein said arm is pivoted manually using a lever tool connected to said arm.

* * * * *

UNITED STATES PATENT AND TRADEMARK OFFICE
CERTIFICATE OF CORRECTION

PATENT NO. : 6,605,013 B2
DATED : August 12, 2003
INVENTOR(S) : Donovan R. Chambers et al.

It is certified that error appears in the above-identified patent and that said Letters Patent is hereby corrected as shown below:

<u>Title page,</u>
Item [60], Related U.S. Application Data, replace "Sep. 15, 2001" with
-- Sep. 15, 2000 --.

Signed and Sealed this

Twentieth Day of January, 2004

JON W. DUDAS
*Acting Director of the United States Patent and Trademark Office*

US006605013C1

(12) INTER PARTES REEXAMINATION CERTIFICATE (897th)
United States Patent
Chambers et al.

(10) Number: US 6,605,013 C1
(45) Certificate Issued: Jun. 26, 2014

(54) BELT TENSIONER COMBINATION AND A METHOD OF INSTALLING A TENSIONER ON A BELT

(75) Inventors: Donovan R. Chambers, Toronto, CA (US); Joseph Atikian, Toronto (CA)

(73) Assignee: Litens Automotive Partnership, Woodbridge, Ontario (CA)

Reexamination Request:
No. 95/002,285, Sep. 14, 2012

Reexamination Certificate for:
Patent No.: 6,605,013
Issued: Aug. 12, 2003
Appl. No.: 09/951,776
Filed: Sep. 14, 2001

Certificate of Correction issued Jan. 20, 2004

Related U.S. Application Data

(60) Provisional application No. 60/232,837, filed on Sep. 15, 2000.

(51) Int. Cl.
    *F16H 7/12*     (2006.01)
(52) U.S. Cl.
    USPC .......................................... 474/135; 474/133

(58) Field of Classification Search
    None
    See application file for complete search history.

(56) References Cited

To view the complete listing of prior art documents cited during the proceeding for Reexamination Control Number 95/002,285, please refer to the USPTO's public Patent Application Information Retrieval (PAIR) system under the Display References tab.

*Primary Examiner* — Russell Stormer

(57) ABSTRACT

A combination comprises a belt trained about a plurality of pulleys and a tensioner assembly including a rotary member rotatively engaged by one side of the belt at an operative position. The rotary member is rotatably mounted on an arm pivoted about a fixed pivotal axis and has a rotational axis parallel with the fixed pivotal axis. The vector force applied by the belt to the periphery of the rotary member at the bisector of the belt wrap angle extends through the rotational axis and is related by at least a small angle to a line passing through the rotational and pivotal axis. The vector force acts in a direction to bias the arm to pivot about the pivotal axis in a direction to move the rotary member into the operative position. The rotary member is initially installed into the operative position by moving the arm in the direction from an installation position.

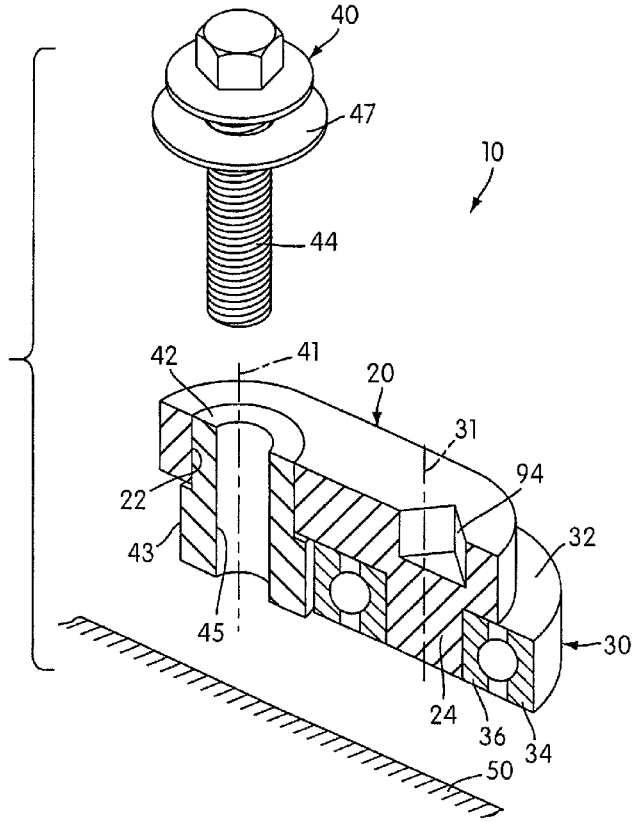

US 6,605,013 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 7 is cancelled.

Claims 1 and 11 are determined to be patentable as amended.

Claims 2-6, 8-10, 12 and 13, dependent on an amended claim, are determined to be patentable.

New claims 14-16 are added and determined to be patentable.

1. A combination comprising:
a belt trained about a plurality of pulleys in a belt drive system; and
a tensioner assembly including a rotary member that is rotationally engaged by one side of said belt when said tensioner assembly is positioned in an operative position, said rotary member being rotationally mounted on an arm that pivots about a fixed pivot axis and said rotary member having a rotational axis that is parallel with said fixed pivot axis, *wherein the geometric configuration of the combination is such that rotation of said tensioner assembly about said fixed pivot axis from a belt contact position at which said rotary member first contacts said belt to said operative position is less than 180 degrees*;
wherein the geometric configuration of the combination permits over-center positioning and self-locking of the tensioner assembly in the operative position such that when the tensioner assembly is positioned in the operative position, the vector sum of force applied by the belt to the periphery of said rotary member extends at at least a small angle relative to a line passing through said rotational and pivot axes, with the vector sum of force applied by the belt to the periphery of said rotary member acting in a direction to bias said arm toward and hold said arm in said operative position; and
wherein the geometric configuration of the combination is such that as said rotary member is being moved into said operative position by pivoting said arm about said fixed pivot axis from an initial, belt installation position toward said operative position, the vector sum of force applied by the belt to the periphery of said rotary member initially acts in a direction to oppose pivoting movement of said arm toward said operative position but changes direction relative to said line passing through said rotational and pivot axes as said arm passes through a central or neutral position so as to bias said tensioner assembly toward and ultimately hold said tensioner assembly in said operative position, said central or neutral position being a pivotal position at which the vector sum of force applied by the belt to the periphery of said rotary member extends directly along the line passing through said rotational and pivot axes.

11. A method of installing a belt tensioner in a belt drive system including a belt trained about a plurality of pulleys, said belt tensioner including an arm having a rotary member rotationally mounted thereon for rotation about a rotational axis, said method comprising:
mounting said tensioner at a predetermined position relative to said belt drive system in a manner so as to pivot about a fixed pivot axis that is parallel with said rotational axis; [and]
*pivoting said arm and said rotary member mounted thereon about said fixed pivot axis of said arm from an initial belt installation position of said tensioner to a belt contact position wherein said rotary member first contacts said belt; and*
[pivoting] *continuing to pivot* said arm and the rotary member mounted thereon about the pivot axis of said arm *by not more than 180 degrees* from [an initial, belt installation position of said tensioner toward and into] said belt contact position to a self-locking, over-center operative position thereof;
wherein as said arm is pivoted from said initial installation position toward and into said operative position, the vector sum of force applied by the belt to the periphery of said rotary member initially acts in a direction to oppose pivoting movement of said arm toward said operative position but changes direction relative to a line passing through said rotational and pivot axes as said arm passes through a central or neutral position and acts in a direction so as to bias said tensioner assembly toward and ultimately hold said tensioner assembly in said operative position, said central or neutral position being a pivotal position at which the vector sum of force applied by the belt to the periphery of said rotary member extends directly along the line passing through said rotational and pivot axes.

14. *The combination according to claim 1 wherein said fixed pivot axis is fixed with respect to the plurality of pulleys.*

15. *A combination comprising:*
*a belt trained about a plurality of pulleys in a belt drive system; and*
*a tensioner assembly including a rotary member that is rotationally engaged by one side of said belt when said tensioner assembly is positioned in an operative position, said rotary member being rotationally mounted on an arm that pivots about a fixed pivot axis and said rotary member having a rotational axis that is parallel with said fixed pivot axis, wherein said rotational axis is spaced apart from said fixed pivot axis by a distance greater than an outer radius of said rotary member;*
*wherein the geometric configuration of the combination permits over-center positioning and self-locking of the tensioner assembly in the operative position such that when the tensioner assembly is positioned in the operative position, the vector sum of force applied by the belt to the periphery of said rotary member extends at at least a small angle relative to a line passing through said rotational and pivot axes, with the vector sum of force applied by the belt to the periphery of said rotary member acting in a direction to bias said arm toward and hold said arm in said operative position; and*
*wherein the geometric configuration of the combination is such that as said rotary member is being moved into said operative position by pivoting said arm about said fixed pivot axis from an initial, belt installation position toward said operative position, the vector sum of force applied by the belt to the periphery of said rotary member initially acts in a direction to oppose pivoting move-* ment of said arm toward said operative position but changes direction relative to said line passing through said rotational and pivot axes as said arm passes through a central or neutral position so as to bias said tensioner assembly toward and ultimately hold said tensioner assembly in said operative position, said central or neutral position being a pivotal position at which the vector sum of force applied by the belt to the periphery of said rotary member extends directly along the line passing through said rotational and pivot axes.

16. A combination comprising:
a belt trained about a plurality of pulleys in a belt drive system; and
a tensioner assembly including a rotary member that is rotationally engaged by one side of said belt when said tensioner assembly is positioned in an operative position, said rotary member being rotationally mounted on an arm that pivots about a fixed pivot axis and said rotary member having a rotational axis that is parallel with said fixed pivot axis, wherein the distance between said rotational axis and said fixed pivot axis defines a pivot arm length which is greater than a radius of said rotary member;
wherein the geometric configuration of the combination permits over-center positioning and self-locking of the tensioner assembly in the operative position such that when the tensioner assembly is positioned in the operative position, the vector sum of force applied by the belt to the periphery of said rotary member extends at at least a small angle relative to a line passing through said rotational and pivot axes, with the vector sum of force applied by the belt to the periphery of said rotary member acting in a direction to bias said arm toward and hold said arm in said operative position; and wherein the geometric configuration of the combination is such that as said rotary member is being moved into said operative position by pivoting said arm about said fixed pivot axis from an initial, belt installation position toward said operative position, the vector sum of force applied by the belt to the periphery of said rotary member initially acts in a direction to oppose pivoting movement of said arm toward said operative position but changes direction relative to said line passing through said rotational and pivot axes as said arm passes through a central or neutral position so as to bias said tensioner assembly toward and ultimately hold said tensioner assembly in said operative position, said central or neutral position being a pivotal position at which the vector sum of force applied by the belt to the periphery of said rotary member extends directly along the line passing through said rotational and pivot axes.

* * * * *